(12) United States Patent
Ansari

(10) Patent No.: US 9,015,787 B2
(45) Date of Patent: *Apr. 21, 2015

(54) METHOD AND SYSTEM FOR MEDIA PROCESSOR

(71) Applicant: AT&T Intellectual Property I, LP, Atlanta, GA (US)

(72) Inventor: Ahmad C. Ansari, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,999

(22) Filed: Apr. 16, 2014

(65) Prior Publication Data

US 2014/0230005 A1    Aug. 14, 2014

Related U.S. Application Data

(63) Continuation of application No. 13/477,471, filed on May 22, 2012, now Pat. No. 8,739,238, which is a continuation of application No. 12/204,536, filed on Sep. 4, 2008, now Pat. No. 8,201,210.

(51) Int. Cl.
| | |
|---|---|
| *H04N 7/173* | (2011.01) |
| *H04N 21/426* | (2011.01) |
| *H04N 21/414* | (2011.01) |
| *H04N 21/418* | (2011.01) |

(Continued)

(52) U.S. Cl.
CPC ............. *H04N 21/426* (2013.01); *G09G 5/006* (2013.01); *G09G 2330/021* (2013.01); *G09G 2370/12* (2013.01); *H04N 21/41407* (2013.01); *H04N 21/4184* (2013.01); *H04N 21/6131* (2013.01); *H04N 21/61* (2013.01)

(58) Field of Classification Search
CPC .................... H04N 7/17318; H04N 21/4334
USPC ............... 725/131–134, 139–142, 151–153; 709/217–262
See application file for complete search history.

(56) References Cited

U.S. PATENT DOCUMENTS

| | | | | |
|---|---|---|---|---|
| 5,729,478 | A | * | 3/1998 | Ma et al. ................ 361/679.41 |
| 5,970,504 | A | * | 10/1999 | Abe et al. ...................... 715/205 |
| 6,075,526 | A | * | 6/2000 | Rothmuller .................. 715/721 |

(Continued)

FOREIGN PATENT DOCUMENTS

JP         2007274065         10/2007

OTHER PUBLICATIONS

Denon Brand Company, "AV Surround Receiver AVR-3808CI, Owner's Manual", http://www.usa.denon.com/ProductDetails/3510.asp, website last visited Sep. 11, 2008.

*Primary Examiner* — Annan Shang
(74) *Attorney, Agent, or Firm* — Guntin & Gust, PLC; Jay H. Anderson

(57) ABSTRACT

A system that incorporates teachings of the present disclosure may include, for example, a presentation device having a controller that performs operations including enabling a supply of power to a portable battery operated device from a presentation port where the presentation port is a high definition multimedia interface port by trickle charging a rechargeable battery of the portable battery operated device through the presentation port, and receiving from the portable battery operated device an audio-visual signal for presentation at the presentation device through the presentation port. Other embodiments are disclosed.

20 Claims, 9 Drawing Sheets

(51) Int. Cl.
*H04N 21/61* (2011.01)
*G09G 5/00* (2006.01)

(56) References Cited

U.S. PATENT DOCUMENTS

| | | | |
|---|---|---|---|
| 6,198,253 B1 * | 3/2001 | Kurle et al. | 320/132 |
| 6,545,448 B1 | 4/2003 | Stanley | |
| 6,570,587 B1 * | 5/2003 | Efrat et al. | 715/723 |
| 6,804,113 B2 * | 10/2004 | Kambayashi et al. | 361/679.45 |
| 7,162,696 B2 | 1/2007 | Wakefield | |
| 7,626,814 B2 | 12/2009 | Seibert | |
| 2003/0108227 A1 | 6/2003 | Philomin | |
| 2005/0144468 A1 | 6/2005 | Northcutt | |
| 2006/0031895 A1 | 2/2006 | Kwon | |
| 2007/0117533 A1 | 5/2007 | Han | |
| 2007/0248328 A1 | 10/2007 | Khan | |
| 2008/0146265 A1 | 6/2008 | Valavi | |
| 2008/0151453 A1 | 6/2008 | Udagawa | |
| 2008/0155230 A1 | 6/2008 | Robbins | |
| 2009/0049498 A1 | 2/2009 | Li | |
| 2010/0003930 A1 | 1/2010 | Giaccherini | |
| 2010/0026912 A1 | 2/2010 | Ho | |
| 2010/0050228 A1 | 2/2010 | Kawashima | |
| 2010/0058427 A1 | 3/2010 | Ansari | |
| 2010/0187903 A1 | 7/2010 | Diab | |

* cited by examiner

600

750

METHOD AND SYSTEM FOR MEDIA PROCESSOR

CROSS-REFERENCE TO RELATED APPLICATIONS

This application is a continuation of and claims priority to U.S. patent application Ser. No. 13/477,471 filed May 22, 2012, which is a continuation of and claims priority to U.S. patent application Ser. No. 12/204,536 filed Sep. 4, 2008 (now U.S. Pat. No. 8,201,210), both of which are incorporated herein by reference in their entirety.

FIELD OF THE DISCLOSURE

The present disclosure relates generally to media devices and more specifically to a method and system for a media processor.

BACKGROUND

Media processors such as today's digital set top boxes (STBs) operate in a residence and are generally confined to a location near a media presentation device such as an analog or digital television set. STBs provide users the ability to view media programs, movies, media guides and so on.

DETAILED DESCRIPTION

One embodiment of the present disclosure entails receiving power at a portable set top box (STB) device when coupled to a presentation device through an HDMI port, decoding in the portable STB device audio-visual information into an HDMI standard format, thereby generating an HDMI signal, and transmitting from the portable STB device the HDMI signal containing decoded audio-visual information in the HDMI standard format to the presentation device by way of the HDMI port.

Another embodiment of the present disclosure entails a computer-readable storage medium having computer instructions for decoding audio-visual information into a HDMI standard format in a portable standalone device and for generating a signal used for presentation of the decoded audio-visual information on a presentation device where the presentation device at least partially powers the portable standalone device when coupled to the presentation device.

Yet another embodiment of the present disclosure entails an STB having a controller to manage power distribution in the STB from power supplied by a port of a presentation device coupled to the STB, decode audio-visual information into a presentation format, and transmit through the port a signal to the presentation device containing decoded audio-visual information.

Yet another embodiment of the present disclosure entails a presentation device having a presentation port to supply power to a media processor, and receive from the media processor an audio-visual signal for presentation at the presentation device.

Figure 1:
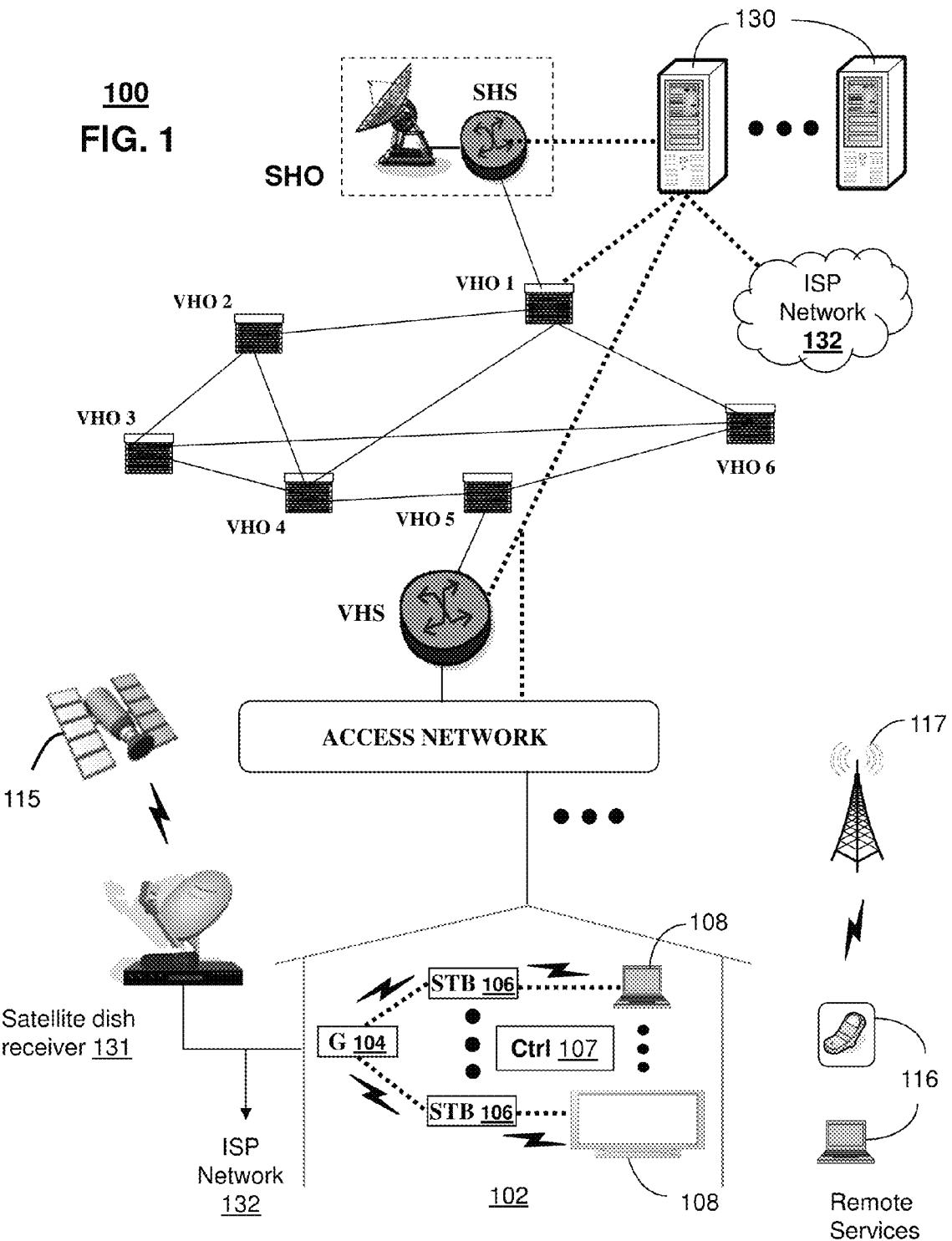
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
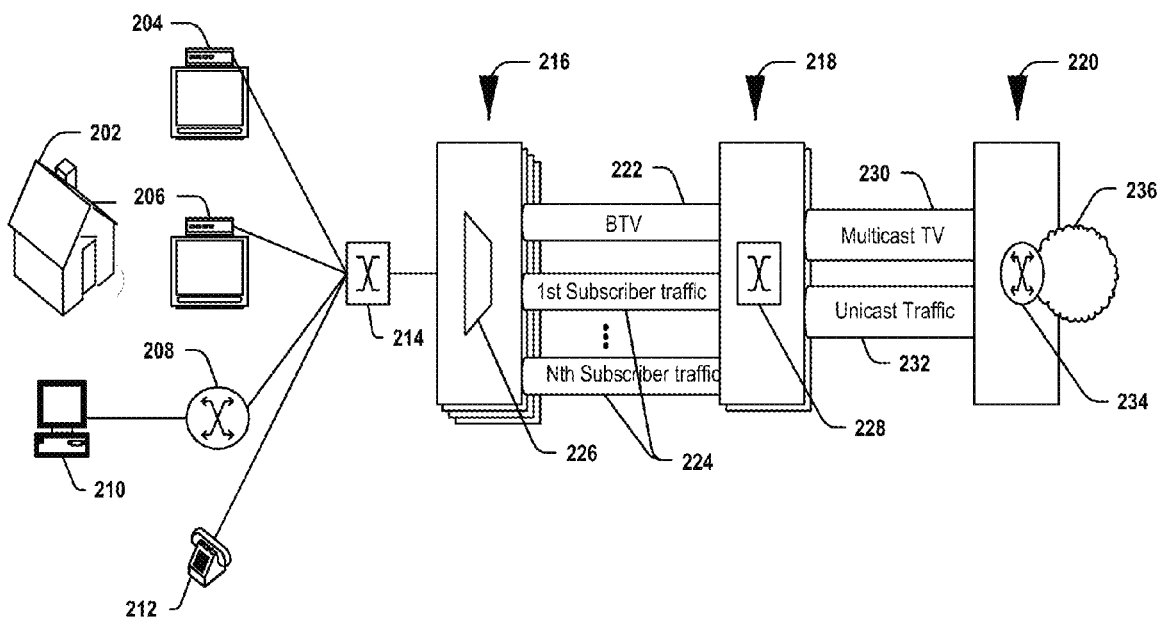

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
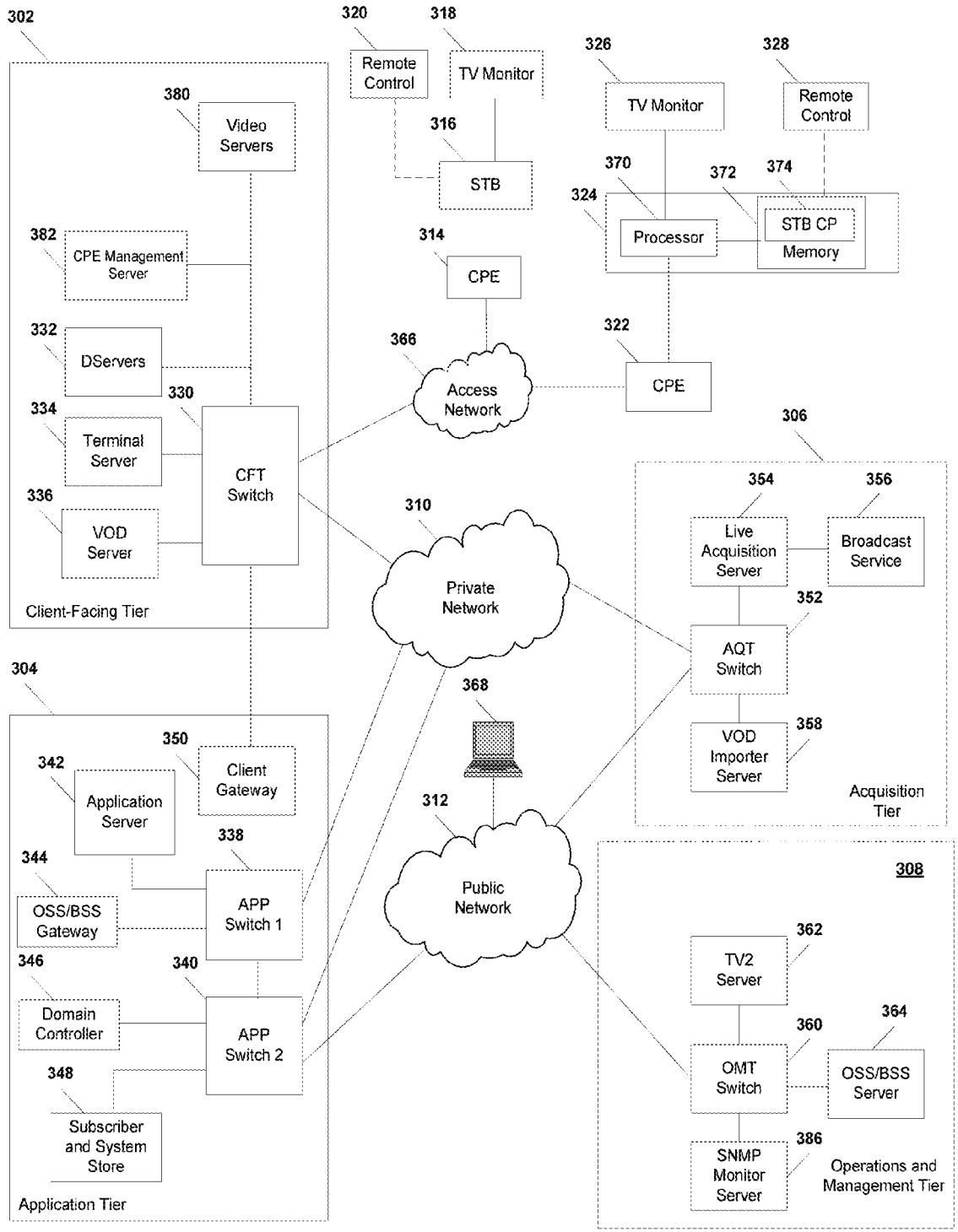

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
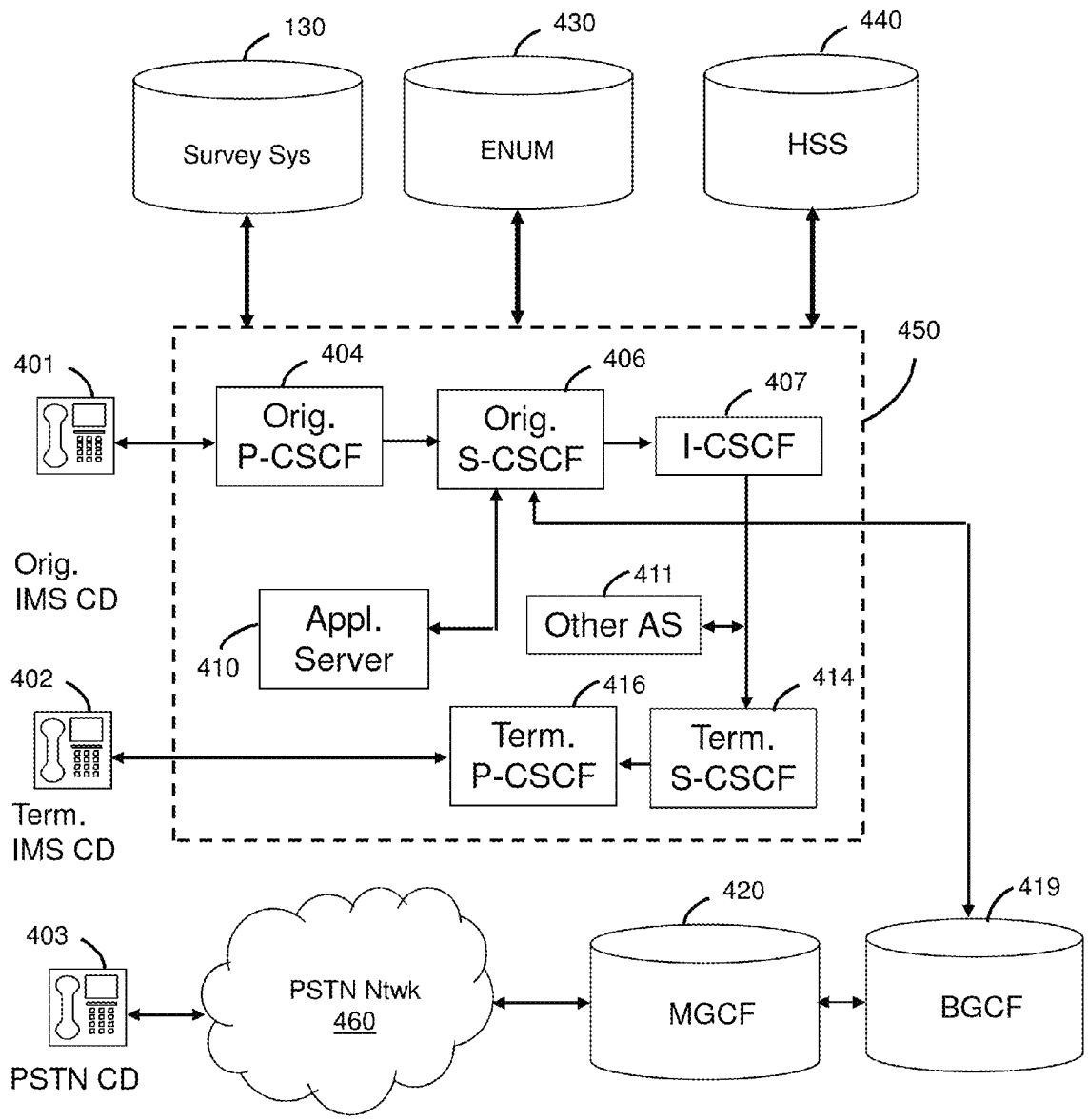

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
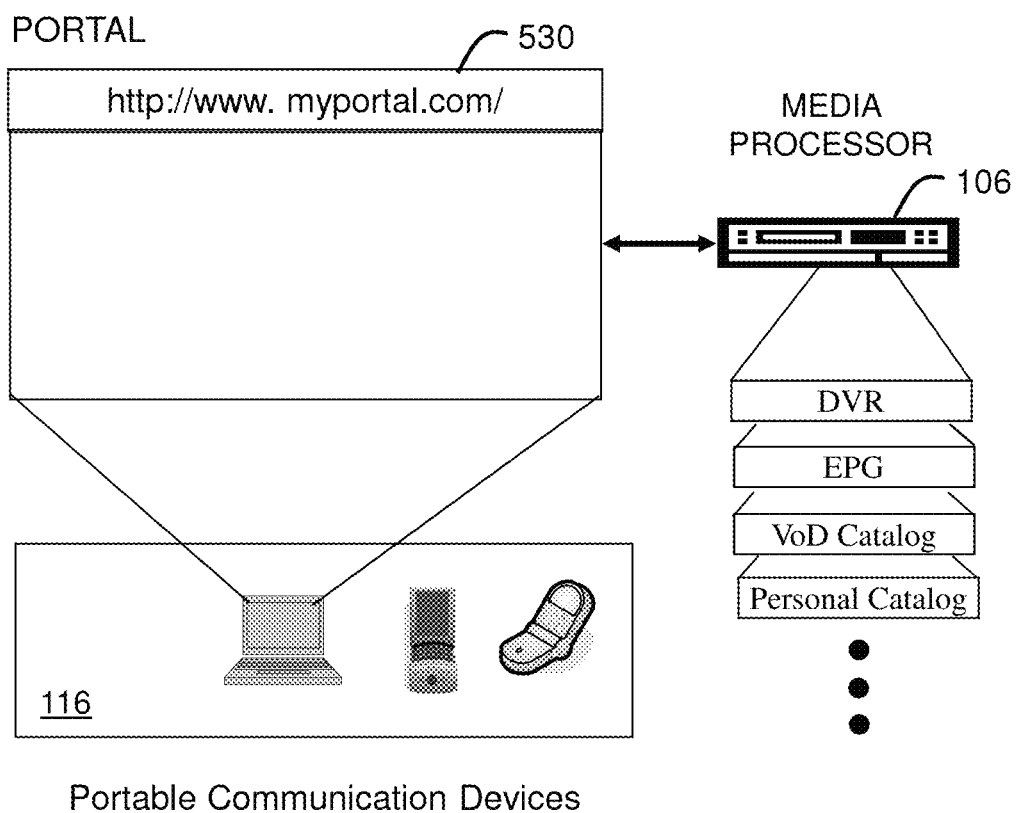
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
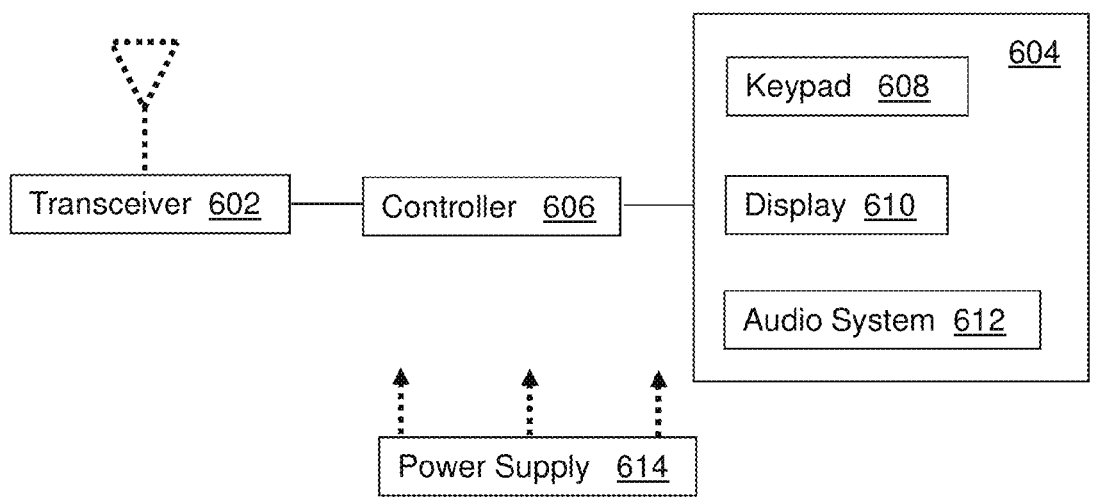
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (e.g., USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
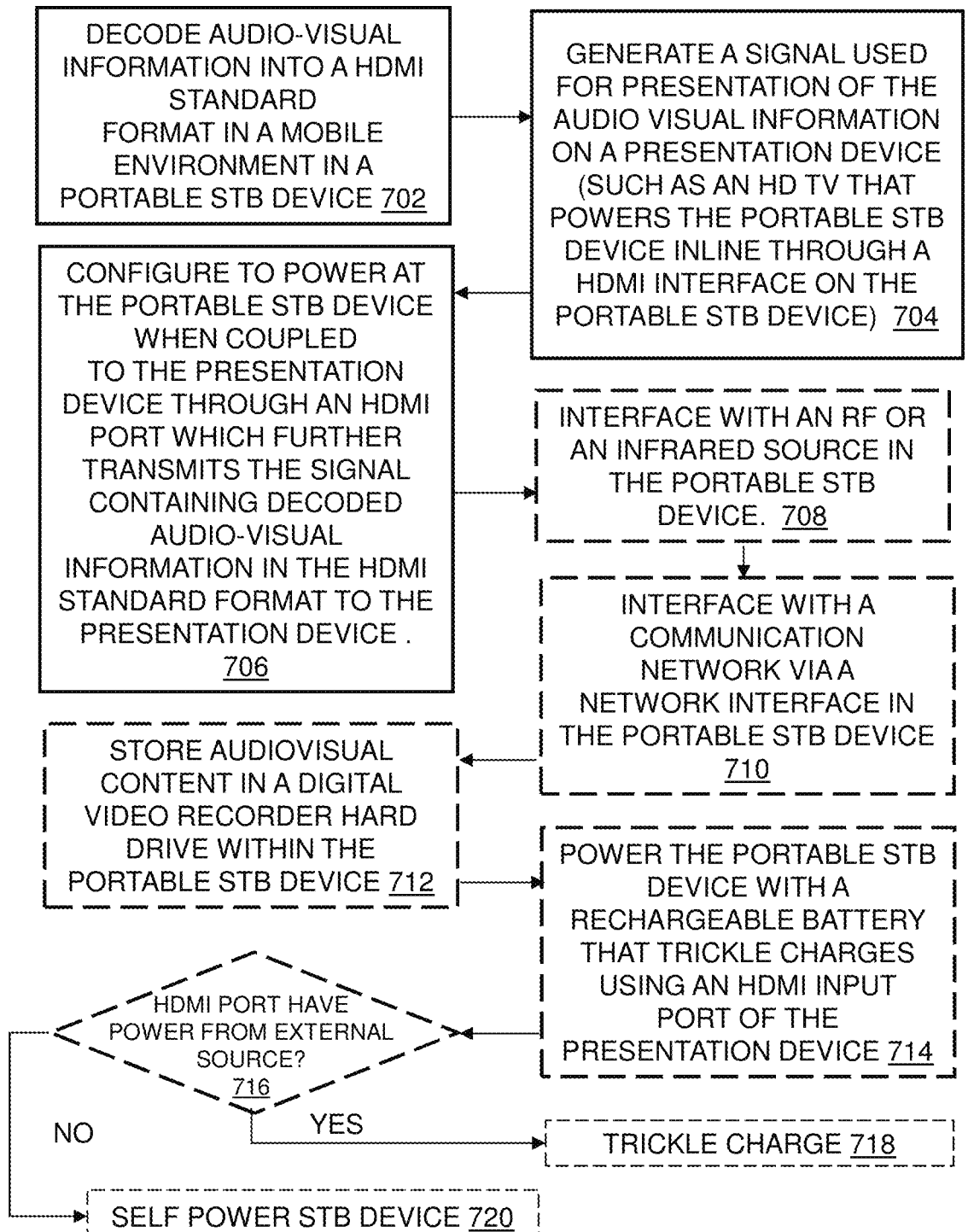
FIG. 7 depicts an illustrative embodiment of a method operating in portions of the communication systems of FIGS. 1-4.

FIG. 7 depicts an illustrative method 700 operating in portions of communication systems 100-400. Method 700 begins with step 702 in which a portable standalone device such as a portable STB device can decode audio-visual information into a HDMI standard format in a mobile environment. At step 704, the portable device can generate a signal used for presentation of the audio visual information on a presentation device such as an HD TV having an HDMI input that powers the portable STB device inline through a HDMI interface on the portable STB device. The portable device can receive power when coupled to the presentation device through an HDMI port which further transmits the signal containing decoded audio-visual information in the HDMI standard format to the presentation device at step 706. The portable device can interface with a radio frequency or an infrared source for remotely controlling the portable device at step 708 and can further interface with a communication network via a network interface at step 710. At step 712, the portable device can store audiovisual content in a digital video recorder hard drive within the portable device. At step 714, the portable device can be powered with a rechargeable battery that is trickle charged using an HDMI input port of the presentation device. Optionally, at decision step 716, the method 700 can detect whether the HDMI port receives power from an external source enabling such trickle charging of the rechargeable battery. If the HDMI port has power from an external source (such as from an HDMI input port of an HD TV), then the rechargeable battery is trickle charged at step 718. If no external power source or no appropriate power source is detected at decision step 716, then the rechargeable battery can solely power the portable STB device at step 720.

Figure 8:
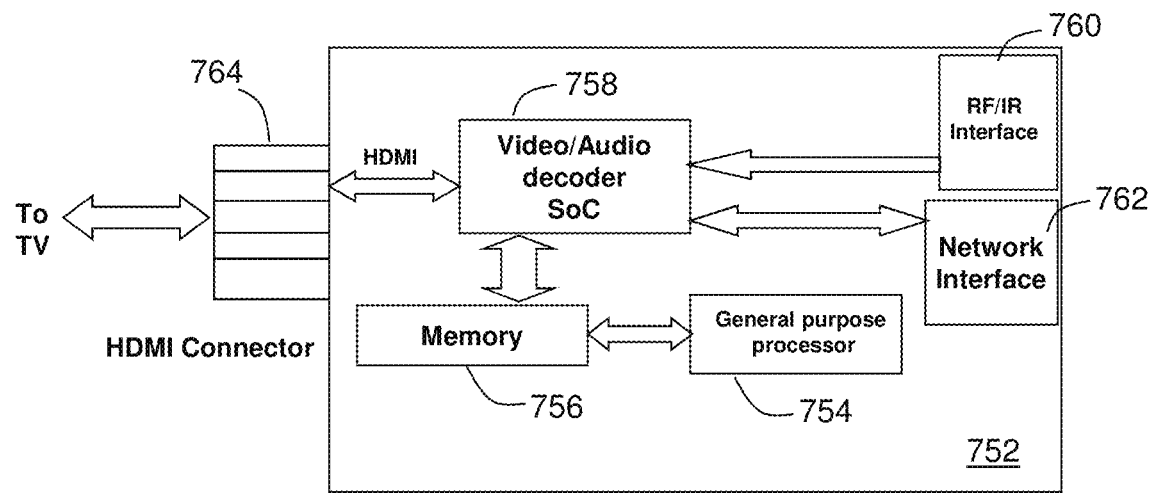
FIG. 8 depicts an illustrative embodiment of a portable STB having an HDMI interface in accordance with an embodiment herein.

Referring to FIG. 8, a portable device 750 such as a portable STB can be any Digital STBs used by cable service providers, Direct Broadcast Satellite (DBS) service providers and IPTV service providers that provide entertainment video and other multimedia services that further include the novel enhancements described herein. The portable device 750 can include for example a digital STB module 752 having a network interface 762, a video and audio decoder engine 758 in the form of a integrated system on chip or SoC, memory 756 (e.g., DRAM or Flash memory), and one or more general purpose processors 754. The Network Interface 762 can be either wireless or wireline or both. A wireless 802.11n or any other wireless networking technology that delivers multimedia content to this unit can be used. A dedicate integrated circuit can provide network processing and interface functionality for the unit. The unit can use any wireline technology such as Ethernet, Home Phoneline Networking Alliance (HPNA) technology, Multimedia over Coax Alliance (MoCA) technology, and Powerline technology (HomePlug) as examples. The device 750 can further include an IR/RF remote control interface 760 as well as digital video output such as an HDMI connector 764 which communicates with the video and audio decoder engine 758. The IR/RF remote control interface 760 can support either an IR or an RF or a combination IR/RF remote control unit to communicate with the portable digital STB. The A/V decoder engine 768 can provide the audio and video decoding functionality as well as the creation of an HDMI compliant stream that is transmitted to the receiving HDMI unit (TV set for example).

The portable device 750 can also include analog video outputs such as composite, component, and S-video outputs, analog audio outputs, digital audio outputs, and an optional hard drive for DVR functionality. The optional hard drive for DVR functionality can be the memory 756. The portable device can also optionally include a USB interface and a power unit the powers the portable device using rechargeable batteries or non-rechargeable batteries. Typically, all TV sets and other HDMI based consumer products can provide enough inline power through the HDMI interface for the portable digital STB to operate. Today, active devices, such as actively powered HDMI cables or in-line signal extender boxes, will by default attempt to power their electronics by taking power from the 5V line (+5V power) available on the HDMI connector. The HDMI specification requires all source devices to provide at least 55 mA (milliamps) on the 5V line for the purpose of reading the EDID of a display. While 55 mA is not enough current to operate some HDMI accessory devices (which typically require more than 100 mA), most source devices on the market today provide significantly more current on the 5V line than the HDMI specification requires. As a result, today the vast majority of HDMI accessory devices can operate when interfaced with a source device that provides more than the required current on the 5V line. The portable digital STB will be able to be powered through the HDMI interface from the receiving device. An optional DC power supply can also be designed to provide power in some case where enough power is not available through inline HMDI powering solution.

Typically, the physical size of a STB is similar to the size of a DVD player and is not designed to be a portable unit. The HDMI interface is used by all new High Definition (HD) television sets to transport very high quality high definition and standard definition (SD) content (video and audio), but has not been used on STBs. Note that the physical size and form factor of the HDMI interface is similar to a USB Interface. Thus, a new portable HDMI-based digital STB as embodied herein can plug into any HDMI input of a TV or other presentation device and can be primarily powered inline through the HDMI interface from the TV set or any other audio/video units with HDMI capability.

Upon reviewing the aforementioned embodiments, it would be evident to an artisan with ordinary skill in the art that said embodiments can be modified, reduced, or enhanced without departing from the scope and spirit of the claims described below. For example, the portable STB device can have non-rechargeable replaceable batteries or can potentially be powered solely by an external device having an HDMI input port. The information decoded and presented can be audio only, video only, or audio-visual content. The portable device can be a digital set top box, but can also be embodied by a digital video recording device or other storage device capable of storing digital content. Further note that the network interface can be wired or wireless.

Other suitable modifications can be applied to the present disclosure without departing from the scope of the claims below. Accordingly, the reader is directed to the claims section for a fuller understanding of the breadth and scope of the present disclosure.

Figure 9:
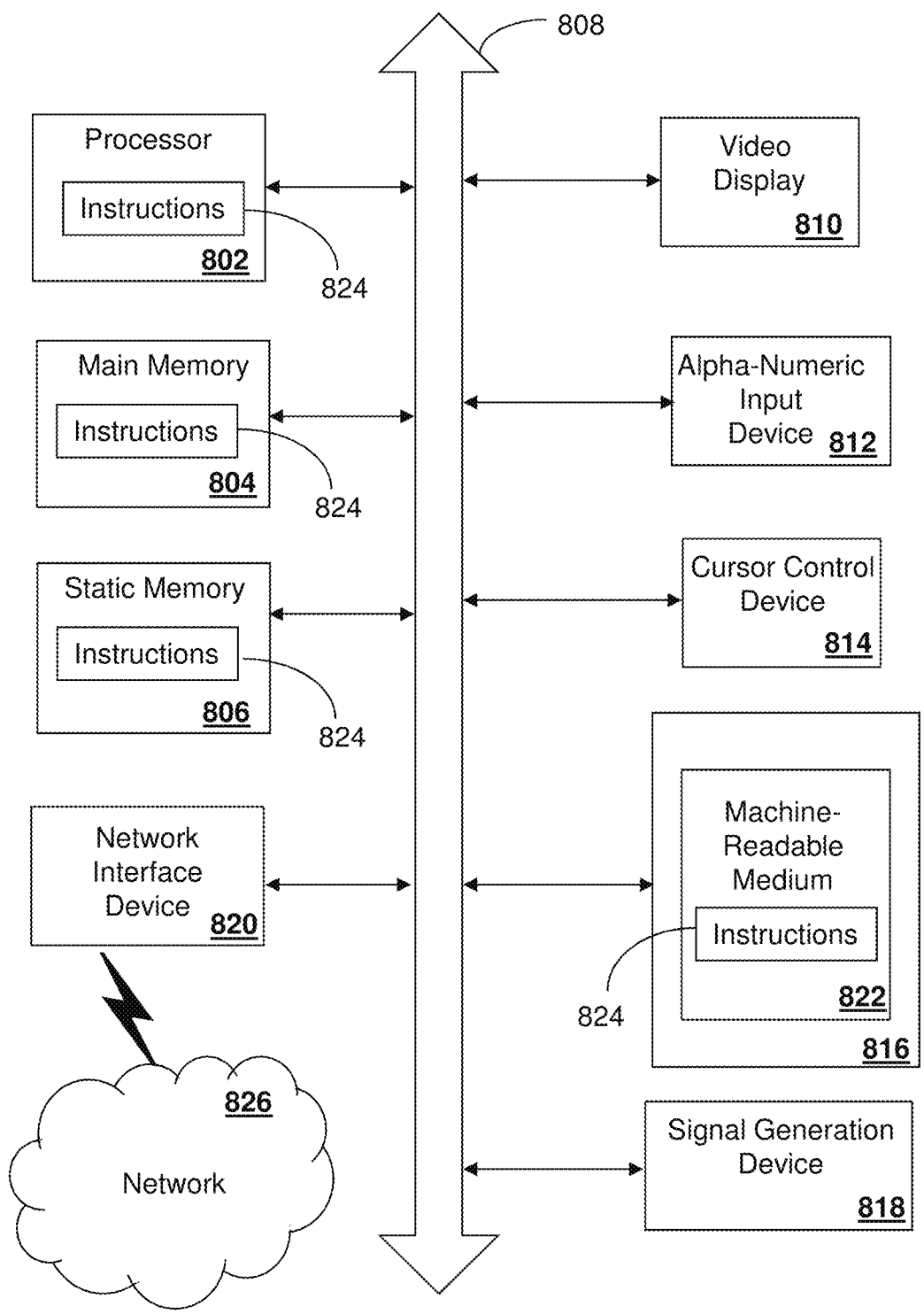
FIG. 9 is a diagrammatic representation of a machine in the form of a computer system within which a set of instructions, when executed, may cause the machine to perform any one or more of the methodologies discussed herein.

FIG. 9 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a computer-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
 decoding in a portable set top box device audio-visual information into a high definition multimedia interface standard format, thereby generating a high definition multimedia interface signal;
 transmitting the high definition multimedia interface signal containing decoded audio-visual information in a high definition multimedia interface standard format from the portable set top box device to a presentation device by way of a high definition multimedia interface port of the portable set top box device, wherein the portable set top box device comprises a rechargeable battery;
 powering the portable set top box device inline through the high definition multimedia interface port of the portable set top box device, wherein the powering comprises powering the rechargeable battery by way of trickle charging using a high definition multimedia interface input port of the presentation device responsive to the portable set top box device being coupled to the presentation device;

interfacing with a communication device by way of a radio frequency or an infrared source of the portable set top box device;

interfacing with a communication network via a network interface of the portable set top box device;

detecting whether the rechargeable battery solely powers the portable set top box device; and detecting, by the portable set top box device, whether the high definition multimedia interface port supplies sufficient power to enable the trickle charging of the rechargeable battery.

2. The method of claim 1, comprising direct powering of the portable set top box device from the high definition multimedia interface port.

3. The method of claim 1, comprising storing audio-visual content in a digital video recorder hard drive within the portable set top box device.

4. The method of claim 1, wherein the presentation device is a high definition television that has the high definition multimedia interface port that powers the portable set top box device inline through the high definition multimedia interface of the portable set top box device.

5. The method of claim 1, comprising decoding in the portable set top box device audio-visual information into the high definition multimedia interface standard format to generate the high definition multimedia interface signal.

6. The method of claim 1, wherein the presentation device comprises a television.

7. The method of claim 6, wherein the presentation device comprises a portable television.

8. A non-transitory computer-readable storage medium, comprising computer instructions that, when executed by a processor, causes the processor to perform operations comprising:

decoding audio-visual information into a high definition multimedia interface standard format in a portable standalone battery operated device; and generating a signal used for presentation of the decoded audio-visual information on a presentation device, wherein the portable standalone battery operated device is at least partially powered by the presentation device responsive to the portable standalone battery operated device being coupled to the presentation device;

applying power to the portable standalone battery operated device inline through a high definition multimedia interface port on the portable standalone battery operated device, wherein the presentation device is a high definition television that has a high definition multimedia interface input port;

trickle charging of a rechargeable battery of the portable standalone battery operated device using the high definition multimedia interface input port of the high definition television;

detecting whether the high definition multimedia interface input port supplies sufficient power to enable trickle charging of the rechargeable battery;

storing audio-visual content in a digital media recorder in the portable standalone battery operated device; and detecting direct powering of the portable standalone battery operated device from the high definition multimedia interface input port, wherein the portable standalone battery operated device is a portable set top box device.

9. The non-transitory computer-readable storage medium of claim 8, wherein the operations further comprise receiving power at the portable standalone battery operated device when coupled to the presentation device through the high definition multimedia interface input port which transmits the signal containing the decoded audio-visual information in the high definition multimedia interface standard format to the presentation device.

10. The non-transitory computer-readable storage medium of claim 9, wherein the operations further comprise interfacing with a communication device using a radio frequency or an infrared source of the portable standalone battery operated device to enable remote control of the portable standalone battery operated device.

11. The non-transitory computer-readable storage medium of claim 9, wherein the operations further comprise interfacing with a communication network via a network interface in the portable standalone battery operated device.

12. The non-transitory computer-readable storage medium of claim 8, wherein the operations further comprise powering the portable standalone battery operated device with the rechargeable battery when the high definition multimedia interface port is not externally powered.

13. The non-transitory computer-readable storage medium of claim 8, comprising computer instructions for detecting whether the rechargeable battery solely powers the portable set top box device.

14. The non-transitory computer-readable storage medium of claim 8, wherein the presentation device comprises a television.

15. The non-transitory computer-readable storage medium of claim 14, wherein the presentation device comprises a portable television.

16. A presentation device, comprising:
a memory to store computer instructions; and
a controller coupled to the memory, wherein the controller, responsive to executing the computer instructions, performs operations comprising:
supplying power to a portable battery operated set top box through a presentation port, wherein the presentation port is a high definition multimedia interface port;
trickle charging a rechargeable battery of the portable battery operated set top box through the presentation port;
receiving from the portable battery operated set top box an audio-visual signal for presentation at the presentation device through the presentation port; and
presenting the audio-visual signal on a display of the presentation device,
wherein the presentation port receives the audio-visual signal for presentation as decoded audio-visual information in a high definition multimedia interface format,
wherein the presentation device comprises a television, and
wherein the portable battery operated set top box detects whether the high definition multimedia interface port supplies sufficient power to enable trickle charging of the rechargeable battery.

17. The presentation device of claim 16, wherein the presentation device comprises a portable television.

18. The presentation device of claim 16, wherein the presentation device comprises a non-portable television.

19. The presentation device of claim 16, wherein the portable battery operated set top box detects direct powering of the portable battery operated set top box from the high definition multimedia interface port.

20. The presentation device of claim 16, wherein the portable battery operated set top box detects whether the rechargeable battery solely powers the portable battery operated set top box.

* * * * *